US007013044B2

(12) United States Patent
Wang (10) Patent No.: US 7,013,044 B2
(45) Date of Patent: Mar. 14, 2006

(54) IMAGE SENSING SYSTEM WITH HISTOGRAM MODIFICATION

(75) Inventor: Yibing (Michelle) Wang, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 75 days.

(21) Appl. No.: 10/747,222

(22) Filed: Dec. 30, 2003

(65) Prior Publication Data

US 2004/0151373 A1 Aug. 5, 2004

Related U.S. Application Data

(62) Division of application No. 09/761,218, filed on Jan. 16, 2001, now Pat. No. 6,792,142.

(51) Int. Cl.
G06K 9/00 (2006.01)
G06K 9/36 (2006.01)
(52) U.S. Cl. ........................................ 382/168; 382/284
(58) Field of Classification Search ................ 382/168, 382/171, 172, 173, 218, 232, 237, 254, 271, 382/276, 284, 443, 522, 530
See application file for complete search history.

(56) References Cited

U.S. PATENT DOCUMENTS

| | | | |
|---|---|---|---|
| 5,710,828 A | | 1/1998 | Hashimoto |
| 5,729,632 A | | 3/1998 | Tai |
| 5,751,848 A | * | 5/1998 | Farrell .................. 382/172 |
| 5,761,344 A | | 6/1998 | Al-Hussein |
| 5,809,177 A | | 9/1998 | Metcalfe et al. |
| 5,815,606 A | | 9/1998 | Baker et al. |
| 5,881,166 A | * | 3/1999 | Farrell .................. 382/168 |
| 5,982,927 A | * | 11/1999 | Koljonen ................ 382/168 |
| 5,982,944 A | * | 11/1999 | Vaidyanathan et al. ..... 382/271 |
| 5,995,671 A | | 11/1999 | Nagarajan et al. |
| 6,141,450 A | | 10/2000 | Chen et al. |
| 6,307,962 B1 | | 10/2001 | Parker et al. |
| 6,347,156 B1 | | 2/2002 | Kamada et al. |
| 6,628,831 B1 | * | 9/2003 | Needham ............... 382/168 |
| 6,738,511 B1 | * | 5/2004 | Farrell et al. ............ 382/168 |
| 6,792,142 B1 | * | 9/2004 | Wang .................. 382/172 |

OTHER PUBLICATIONS

G. Larson, "A Visibility Matching Tone Reproduction Operator for High Dynamic Range Scenes", Tech Rep LBNL-39883, Lawrence Berkeley National Laboratory, 1997.

* cited by examiner

*Primary Examiner*—Andrew W. Johns
*Assistant Examiner*—Amir Alavi
(74) *Attorney, Agent, or Firm*—Dickstein Shapiro Morin & Oshinsky LLP (57) ABSTRACT

A histogram is modified by using an adaptive system. Two different thresholds are set: a threshold of a number of pixels which can be changed, and another threshold indicative of a total number of pixels which can be combined together. The thresholds can be adaptively based on results of frame operations.

16 Claims, 4 Drawing Sheets

Original Histogram
FIG. 4

Modified Histogram
FIG. 5

IMAGE SENSING SYSTEM WITH HISTOGRAM MODIFICATION

BACKGROUND

This application is a divisional of application Ser. No. 09/761,218 filed Jan. 16, 2001, now U.S. Pat. No. 6,792,142 the subject matter of which is incorporated by reference herein.

Many different image sensing systems are known in the art.

Viewing of images is limited by the resolution of the viewing screen that is being used. Sometimes, however, the resolution of a view screen is not sufficient to see a specified image, especially one with motion.

For example, a high dynamic range scene may have a dynamic range of 18 bits or even more. This would require a display device that could display $2^{18}$ resolvable levels of brightness. Many display devices today, however, show only $2^8=256$ levels of brightness.

It is desirable to display an image on such a display while preserving much of its detailed information. Dynamic range compression can be used for this purpose.

It is known to compress dynamic range using logarithmic compression, homomorphic filtering, "cut and paste" methods, and histogram equalization and adjustment. Logarithmic compression carries out a transformation of $$s = 255x\frac{\log(1+|g|)-\log(1+|G\min|)}{\log(1+|G\max|)-\log(1+|G\min|)} \quad (5.1)$$

Homomorphic filtering is a frequency domain procedure which associates low frequencies of a Fourier transform of the log of the image with illumination high frequencies. These are associated with reflectance using a filter which associates low-frequency with illumination and high frequency with reflectance.

The cut and paste methods cuts data blocks from different intensity images and pastes them into one background image at corresponding locations. This may produce a gray level which is not a monotonic response to light level, which may produce distortion in the final displayed image.

BRIEF DESCRIPTION OF THE DRAWINGS

These and other aspects will now be described in detail with reference to the accompanying drawings, wherein.

SUMMARY

The present application teaches a system of histogram modification that compresses dynamic range of an image into regions which have fewer samples.

The present application uses a new form of histogram compression which determines areas which have less information therein, and compresses them. The compression is based on a number of observations, including the way that the human eye perceives light intensity levels.

DETAILED DESCRIPTION

The present application relies on compression of histograms in a special way.

Figure 1:
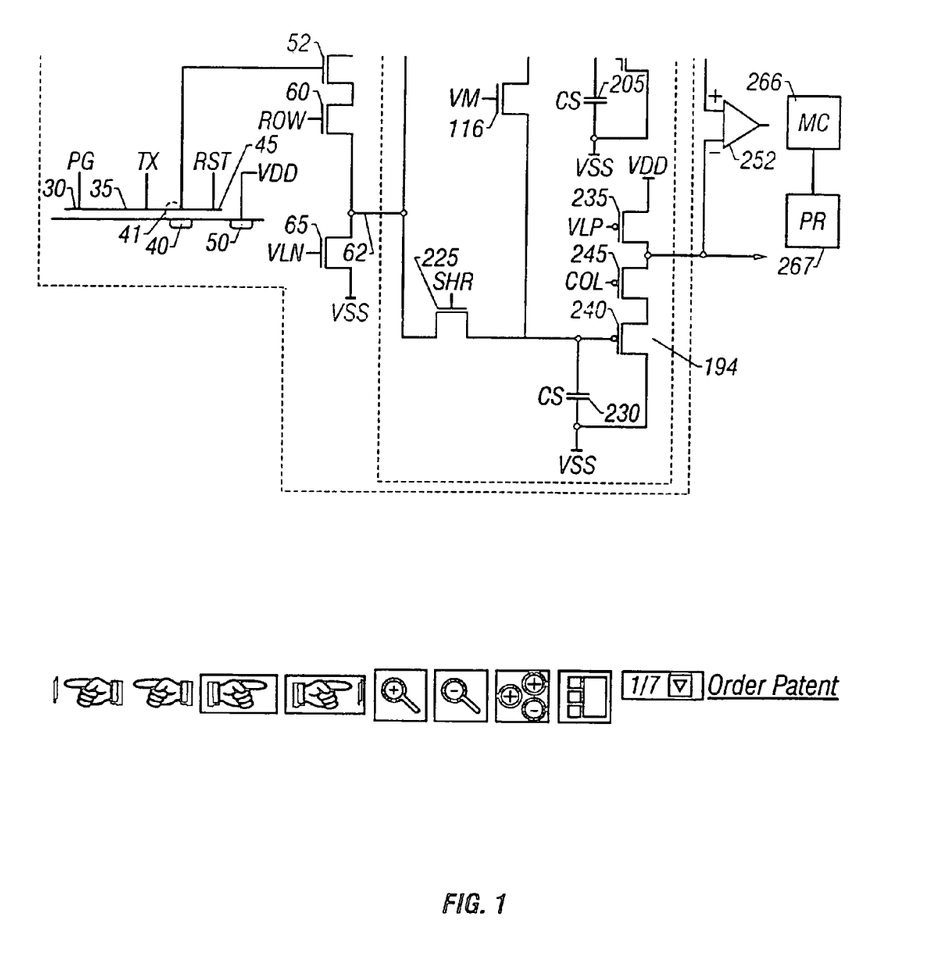
FIG. 1 shows a system level view of the modification system.

A basic system formed of an active pixel sensor is shown in FIG. 1. The active pixel sensor in FIG. 1 uses a photogate 30 which accumulates charge under or adjacent to the structure. However, any other photoreceptor element, such as a charge injection device, pinned photodiode or other photodiode could be used.

The accumulated charge can be transferred by pulsing a PG to force charge through a transfer gate 35 to a floating diffusion 40. Floating diffusion 40 can also be reset to a reset level ($V_{DD}$) that is present in diffusion 50. Reset gate 45 is activated to carry out the reset.

Each pixel includes at least two transistors: a first transistor 65 configured as a follower, and a second transistor 60 configured as a pixel selector. The output of each pixel 62 is connected to a processing circuit, which in this case is common to an entire column of pixel devices. The processing circuit may include a correlated double sampling circuit 199, that samples the signal level by turning on transistor 200 and sampling it on to capacitor 205. The reset level can also be sampled by turning on transistor 225 and sampling that reset level onto capacitor 230. Then, the difference between the two capacitance levels is obtained by a differential amplifier 252.

The column select circuitry also shows column selecting transistors such as 240, which enables selecting a specific column at a specific time.

The output of the pixel is accumulated in a specified way. According to the present application, the pixels may be processed on the fly, without a memory. A processor element 265 can then image process the pixels. This processor element can be a dedicated processor which carries out instructions, a specialized image processor, such as an image processor chip, a DSP which is configured for image processing, or analog gates which are arranged by using hardware definition language to carry out a specified function. The image processing carried out herein uses a special form of histogram equalization as described.

Figure 2:
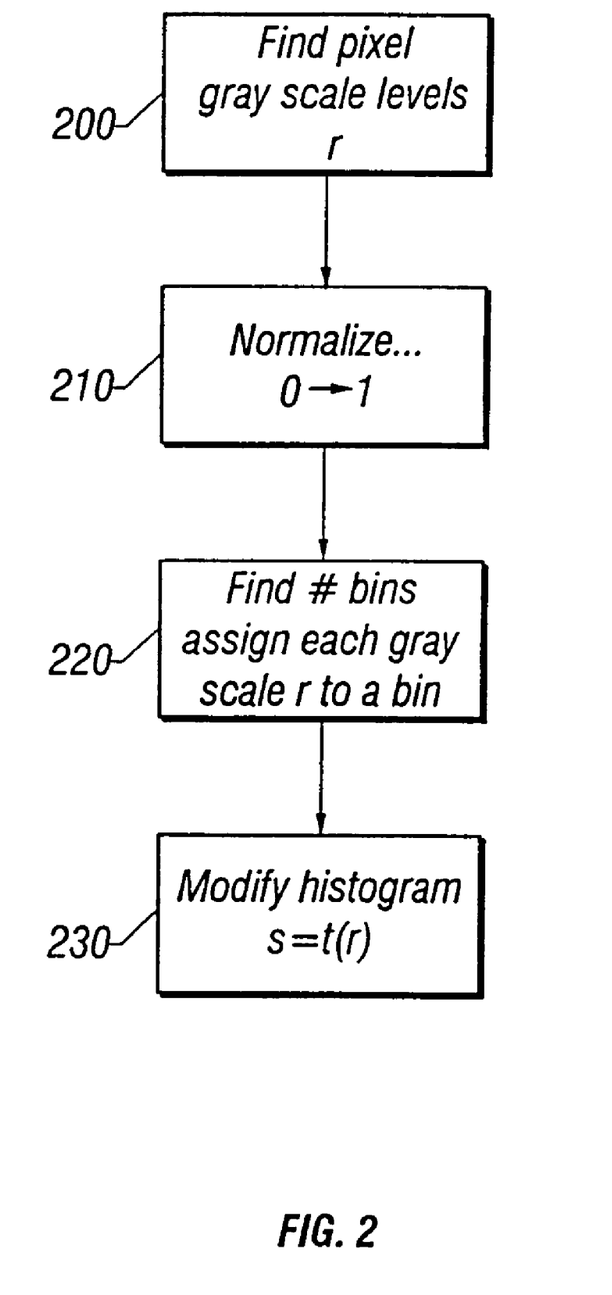
FIG. 2 shows a system level flowchart.

The histogram modification is carried according to the general flowchart of FIG. 2.

At 200 the gray scale of each image pixel in the memory is found. For convenience, the gray scale level, here r, is normalized at 210 to values extending between 0 and 1, with 0 representing total black and 1 representing total white. A number of histogram bins are constructed, set, for example, by the number of levels in the image sensor. At 220, each of the image pixels is binned, that is, assigned to a bin of the histogram.

At 230, the histogram is modified. In general, histogram modification produces a new level s for every pixel value r in the original image such that s=t(r), where t is the transformation function.

According to the present system, the transformation function may have the characteristic that t(r) is single valued and monotonically increasing in the interval of 0 to 1. This preserves the order from black to white in the gray scale. T(r) should also be between 0 and 1 for r between 0 and 1. This provides a mapping that is consistent with the allowed range of pixel values.

An inverse transformation may also be defined as $r=t^{-1}(s)$, with s between 0 and 1.

The original gray levels r in the image may be random quantities. The transformed gray levels 5, however, can be characterized by any desired feature based on t. For example, the probability densities of the transformed values can be used. However, previous systems have compressed not only the dynamic range, but also compressed contrast in the most highly populated regions of the histogram. Contrast in large areas of the image may thereby become exaggerated.

A Visibility Matching Tone Reproduction Operator for High Dynamic Range Scenes", Tech Rep LBNL-39883, Lawrence Berkeley National Laboratory, March, 1997 by Ward, describes a system that which while useful, requires iteration to form a tolerance criterion.

According to the present system, the waveform or image content of the histogram is investigated to find its dip areas, i.e., the areas with relatively fewer pixels falling on them. These gray levels are less noticed when one views the entire image. Therefore, this dip area of the histogram represents the part of the image that has a dynamic range that is not being as effectively noticed as others.

The present system compresses these dip areas.

This compresses the entire dynamic range of the image. It also simultaneously enhances the image. In addition, as described in the Ward publication described above, the eye is really most sensitive to the presence in an image of bright areas and dim areas. As long as the bright areas are displayed by higher luminances than the dim areas, the absolute value of the difference becomes less noticeable.

Figure 3:
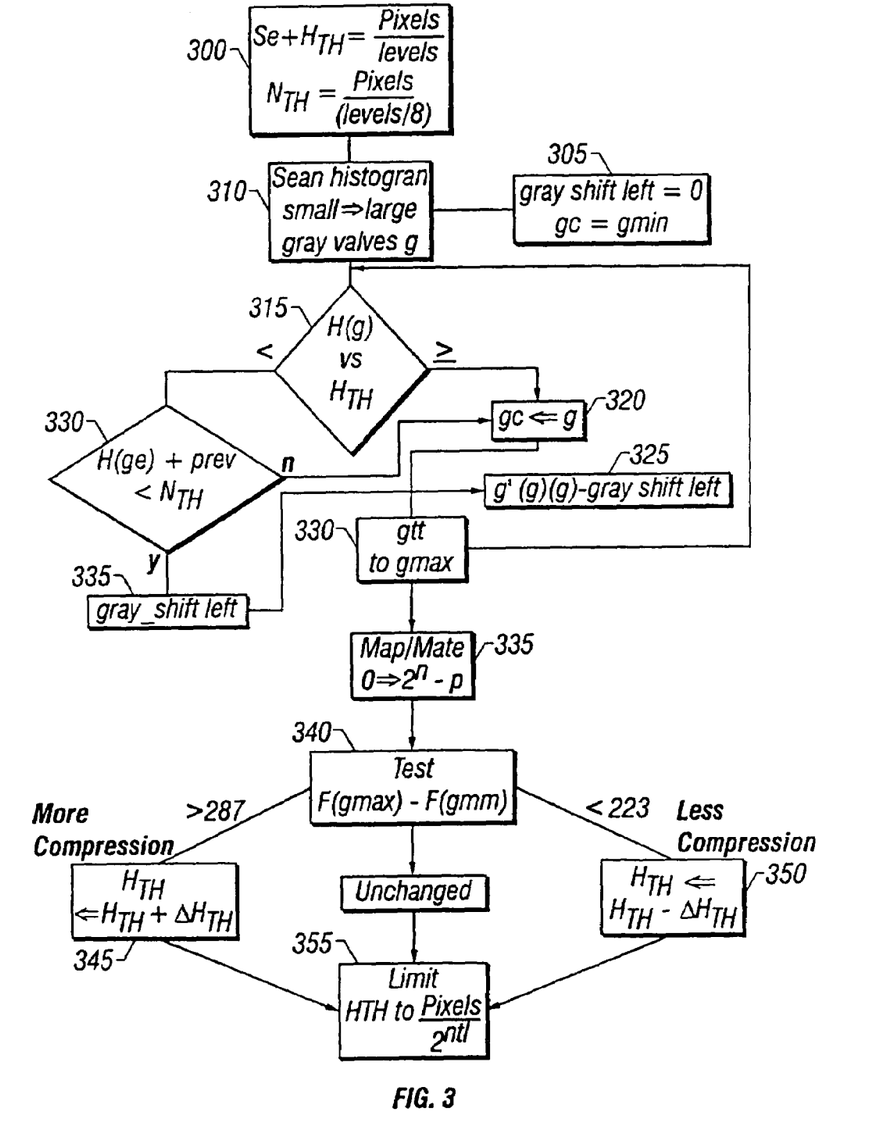
FIG. 3 shows a more detailed flowchart.

The dip compression system of the present application operates as shown in the flowchart of FIG. 3. This may process frames of information obtained from an active pixel sensor. The system starts with an initialization at 300. This sets a threshold value $H_{th}$ to an initial value of the number of pixels divided by the number of levels. Another threshold value $N_{th}$ is set to pixels divided by (levels/2) $N_{th}$ limits the total number of pixels that can be combined together. This is done to prevent generation of another peak in the histogram dip area which could itself cause unwanted effects in the image. The $N_{th}$ is also referred to herein as the pixel sum.

The thresholds can be set to other values. For example, $H_{TH}$ may be is initially set to (number of pixels in the image)/$2^{n+2}$.

The Pixel sum may initially set to (the number of pixels in the image)/2.

Local values are also set at 305 including the GRAY_SHIFT_LEFT value which is set equal to 0, and the value of the common last gray value ($g_c$) which set to the minimum value of the gray scale minimum value $g_{min}$. $G_{min}$ will equal O if the normalization described above has been used.

The image is then processed, by comparing each bin of the histogram to the thresholds, and adjusting different values based on the comparison.

At 310, the histogram is scanned from small to large gray values g. Each histogram value H(g) is compared with the current threshold $H_{th}$ at 315. If the current H(g) is greater than the threshold $H_{TH}$, then the common gray value $g_c$ is set to the current g at 320, the new gray level g'(g) is set to (g−GRAY_SHIFT_LEFT) value at 325 and g is incremented at 330. The process then returns to 315 which compares the new histogram value H(g) with the threshold $H_{TH}$.

If the histogram value H(g) is not greater than the threshold at 315, then flow passes to the left at 315 which causes modification of the histogram. In this case, first a test is made to make sure that the total number of pixels to combine together does not exceed the threshold limit $N_{TH}$. This is shown in 330, where the histogram value of the last common value h(gc) is added to the previous sums and compared against the pixel sum threshold $N_{TH}$. If the value is still below the threshold, GRAY_SHIFT_LEFT is incremented at 335, and again the operation occurs by flow passing to 325 where the new gray level is set to the new gray shift left value, and g is incremented.

If the previous value does exceed the pixel sum, then the current pixel value is set and the operation proceeds to step 320 just as if the current value has exceeded the threshold. Writing this in more mathematical terms.

If H(GC)+(G−GC+1)H(GC+1)+(G−GC)H(GC+2)+ . . . +3H (G'1)+2H(G)<PIX_SUM, (*the new accumulated value is less then the pixel sum*) then GRAY_SHIFT_LEFT++ else loop.

When g max is reached at 330', the entire frame has been mapped to a new histogram. 335' maps the compressed image from g' min to g' max to 0 to $2^{n-1}$. This provides mapping of the current frame. At 340, the new minimum and maximum gray levels g'min and g'max are checked.

After the frame has been completely processed, the results may be used to adaptively change the threshold(s). An allowable range for the threshold is set, here between pixels/$2^{n+3}$, and pixels/$2^{n+1}$. The threshold can have any value between two extremes. According to this system, if g' max minus g' min is greater than $2^{n+2}+2^{n-3}$(here 287), then more compression is requested at 345. Here 345 shows increasing the threshold by a value $\Delta H_{TH}$. Conversely, if g' max minus g' min is less than $2^{n-2}-2^{n-3}$ (here 223), then less compression is requested at 350 by decreasing the threshold by $\Delta H_{TH}$. The new threshold is limited to pixels/$2^{n+1}$ at 355. After this operation, the next frame is processed, by passing control to 305 which resets the GRAY_SHIFT_LEFT level and the common gray level for the next frame and repeats the operation.

Figure 4:
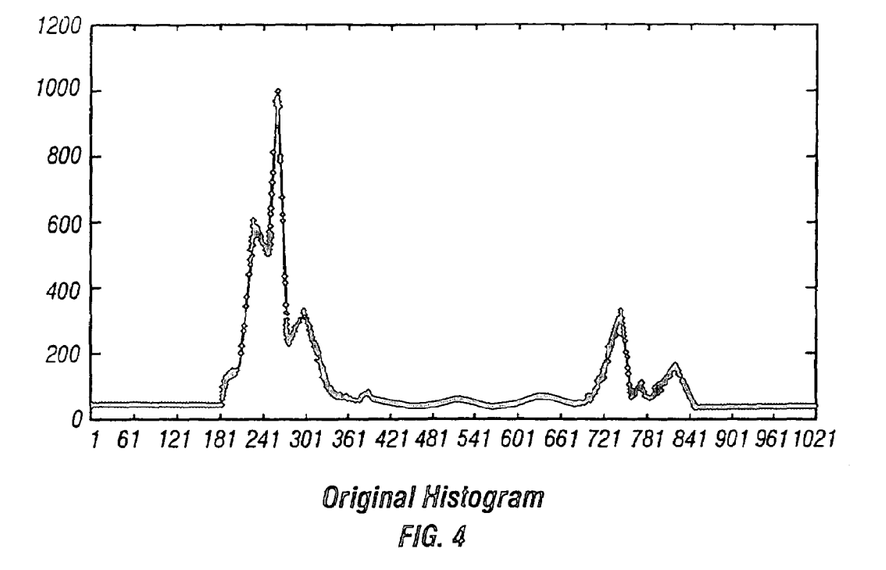
FIGS. 4 and 5 show an original histogram and a modified histogram, respectively.
Figure 5:
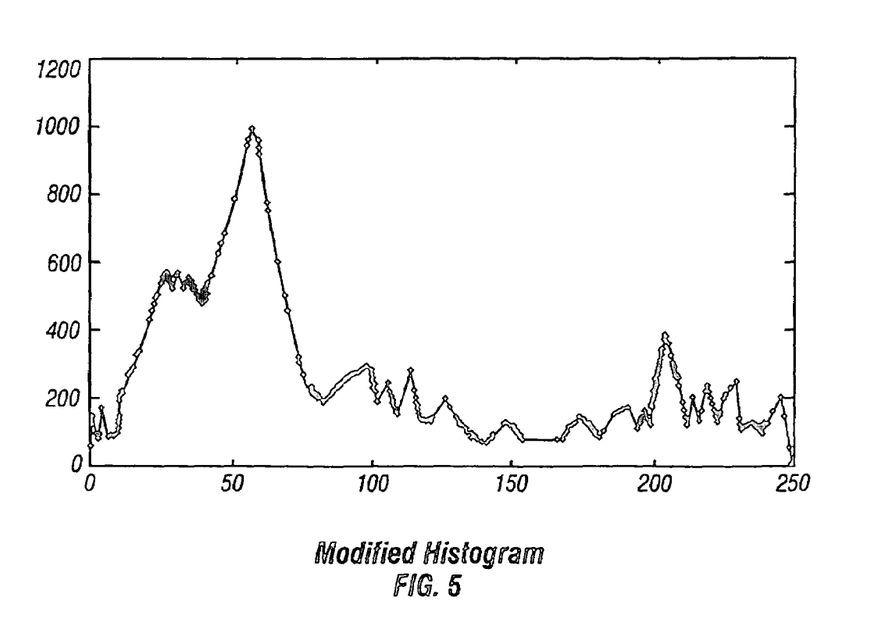

The constraint functions in 340–355 can reduce gaps between peaks of the histogram without convergence. In this way, the original histogram can be modified to be better viewed. For example, FIG. 4 shows an original histogram of a sample image. This is modified as shown in FIG. 5 to show the modified histogram. Note that many of the peaks remain the same.

This is called a weighted sum constraint function.

What is claimed is:

1. A method of processing an image, comprising:
   obtaining values indicative of the image;
   placing said values in bins representing values of a histogram, said bin each representing a value for gray scale of the image part;
   setting a pixel threshold value, below which values of pixels will be combined;
   setting a number of pixel value, indicating a maximum number of pixels which can be combined together; and
   testing each pixel to determine if it is below said pixel threshold and below said pixel number threshold, and combining said pixel with another pixel only if so.

2. A method for modifying a histogram comprising:
   determining gray scale values of each pixel of an image, said gray scale values contained in said histogram;
   normalizing said gray scale values;
   constructing a plurality of gray scale bins;
   assigning each normalized gray scale value to one of said plurality of gray scale bins; and
   modifying said histogram of normalized gray scale values according to a transformation function.

3. The method according to claim 2, wherein said transformation function transforms each normalized gray scale value to a transformed gray scale value.

4. The method according to claim 3, wherein said transformation function is a probability density function of the transformed gray scale values.

5. The method according to claim 2, wherein said transformation function is single valued, said single values monotonically increase in the normalized interval, wherein said normalized interval is between 0 and 1.

6. The method according to claim 2, further comprising compressing dip areas of said histogram.

7. The method according to claim 6, wherein compressing said dip areas further comprises:
  initializing a first threshold value;
  initializing a second threshold value, wherein said second threshold value limits a total number of pixel gray scale values that can be combined;
  setting a gray shift left value to zero;
  setting a value of a common last gray scale value to a minimum gray scale value;
  comparing each normalized gray scale value of each bin to said first and said second threshold;
  adjusting said gray scale values based on a result of said comparison;
  determining a gray scale maximum;
  subtracting said gray scale minimum from said gray scale maximum;
  adaptively adjusting said first threshold; and
  limiting said adaptively adjusted first threshold to a number of pixels divided by $2^{n+1}$.

8. The method according to claim 7, wherein said first threshold value is a number of pixels divided by a number of gray scale levels.

9. The method according to claim 7, wherein said first threshold value is a number of pixels divided by $2^{n+2}$.

10. The method according to claim 7, wherein said second threshold value is a number of pixels divided by a number of gray scale levels divided by 2.

11. The method according to claim 7, wherein said first threshold value is a number of pixels divided by 2.

12. The method according to claim 7, wherein said minimum gray scale value is set to zero.

13. A image processor comprising:
  an input for receiving pixel image values; and
  a processing section for:
    determining gray scale values of each pixel of an image, said gray scale values contained in a histogram;
    normalizing said gray scale values;
    constructing a plurality of gray scale bins;
    assigning each normalized gray scale value to one of said plurality of gray scale bins; and
    modifying said histogram of normalized gray scale values according to a transformation function.

14. The image processor according to claim 13, said processing section further performing the following operation;
  compressing dip areas of said histogram.

15. The processor according to claim 14, wherein said image processor performs the operation of compressing dip areas of said histogram by further performing the following operations:
  initializing a first threshold value;
  initializing a second threshold value, wherein said second threshold value limits a total number of pixel gray scale values that can be combined;
  setting a gray shift left value to zero;
  setting a value of a common last gray scale value to a minimum gray scale value;
  comparing each normalized gray scale value of each bin to said first and said second threshold;
  adjusting said gray scale values based on a result of said comparison;
  determining a gray scale maximum;
  subtracting said gray scale minimum from said gray scale maximum;
  adaptively adjusting said first threshold; and
  limiting said adaptively adjusted first threshold to a number of pixels divided by $2^{n+1}$.

16. The image processor according to claim 13, wherein said processor is a digital signal processor.

* * * * *

UNITED STATES PATENT AND TRADEMARK OFFICE
CERTIFICATE OF CORRECTION

PATENT NO. : 7,013,044 B2
APPLICATION NO. : 10/747222
DATED : March 14, 2006
INVENTOR(S) : Yibing (Michelle) Wang It is certified that error appears in the above-identified patent and that said Letters Patent is hereby corrected as shown below:

The sheets of drawing consisting of figure 1 and figure 3 should be deleted to appear as per attached figures 1 and 3.

Column 3, line 33, "(levels/2) $N_{th}$" should read --(levels/2). $N_{th}$--; and Column 4, line 10, "(G'1)" should read --(G-1)--.

Signed and Sealed this

Ninth Day of October, 2007

JON W. DUDAS
*Director of the United States Patent and Trademark Office*

FIG. 1

FIG. 3